United States Patent [19]
Hamel

[11] Patent Number: 5,423,670
[45] Date of Patent: Jun. 13, 1995

[54] ENHANCED THERMAL TRANSFER INJECTION MOLDING APPARATUS

[76] Inventor: Julio E. Hamel, 67 Porter Rd., Cambridge, Wash. 02140

[21] Appl. No.: 133,328

[22] Filed: Oct. 8, 1993

[51] Int. Cl.$^6$ ............................................. B29C 45/73
[52] U.S. Cl. ................................. 425/144; 264/40.6; 425/547; 425/548; 425/552
[58] Field of Search ............... 425/144, 547, 548, 552; 264/40.6

[56] References Cited

U.S. PATENT DOCUMENTS

| | | | |
|---|---|---|---|
| 3,733,161 | 5/1973 | Nussbaum | 425/144 |
| 5,055,025 | 10/1991 | Muller | 425/144 |
| 5,061,174 | 10/1991 | Gellert | 425/549 |

Primary Examiner—Tim Heitbrink

[57] ABSTRACT

In injection molding, a mold forms a wall member, which defines a cavity, by bringing together two mold halves. The cavity wall is formed by a specially machined cavity plate having built-in support columns, fins and ejector pins columns. The plate forms a passageway and in-out flow chambers on the opposite side from the cavity surface which completely surrounds the cavity where coolant or heating circulating carrier flows at high rates. The resulting flow of coolant/heating carrier at high rates can be controlled by special positioning of the flow chambers and creates added turbulence. The built-in support columns, fins and ejector pins also dramatically increase the area of contact of the flow carrier with the cavity plate. The design incorporates built-in support columns and fins which make possible a thinner cavity surface plate by adding strength and structural support to the cavity area. The exact arrangement and geometry of the built-in support columns, fins, and flow chamber depend on the part design and can be adjusted depending on the application to increase the uniformity and heat transfer rates. The plate design can be adapted to movable cores and stationary mold cavity cores.

13 Claims, 5 Drawing Sheets

ENHANCED THERMAL TRANSFER INJECTION MOLDING APPARATUS

BACKGROUND OF THE INVENTION

The present invention refers to an injection molding mold for molding plastic materials.

In general, an injection mold forms a cavity in which the fluid plastic is forced and allowed to solidify to reproduce the shape of the mold. In order to heat and cool the mold a heat transfer medium or heat flow carrier is used which flows through respective channels. Because of the limited heat removal rates achieved in conventional tooling designs the injection and cooling cycles are longer than necessary and the heat removal rates can fluctuate widely within a specific cavity thereby resulting in uneven part dimensional characteristics and longer production cycle times. In addition, the poor heat removal characteristics of existing tooling designs result in much higher injection pressures and clamp tonnages. In conventional tooling the plastic material stops flowing as soon as it encounters a much cooler cavity wall, the solidification starts to decrease the thickness of the molten plastic flowgap in the cavity and pressure losses are increased. This invention dramatically increases the heat transfer rate between the cavity wall and the plastic thereby making possible a much more uniform and faster cooling/heating of the cavity and the part. This has the effect of reducing the injection pressures required during the injection phase of the cycle and speeding the cooling phase of the cycle by cooling the molten plastic much more efficiently.

SUMMARY OF THE INVENTION

The object of the present invention is to provide an improved injection molding mold for the plastic materials. This object and others which will become apparent hereinafter, are attained in accordance with the present invention by designing a specially machined cavity plate which forms a flow passageway which surrounds the cavity thereby increasing the uniformity and rate of heat transfer from the molten plastic to the heat removal fluid carrier.

An essential feature of the present invention is the fabrication of the special cavity plate insert which increases the heat transfer rates and the uniformity of cooling throughout the cavity. The design of the plate depends on the part design geometry and material properties of the plastic being molded. The attainment of uniform heat transfer rates throughout the part can be controlled by changing the physical arrangement of the fins, support columns and flow chambers in such a way as to obtain uniform flow of coolant throughout the cooling/heating passageway. Different geometric shapes of fins, support and flow chambers can be utilized to control the flow of coolant/heat carrier. The cooling/heating passageway height can also change according to part design considerations in order to obtain optimum heat transfer. The plate design can be adapted to movable cores and stationary cores, such as those used in car battery cases. This new design provides for added stiffness to internal cores molding thin wall compartments as well as providing increased heat removal rates.

In addition, the improved cooling system may be used in conventional tooling designs without the use of the preliminary heating method for molding described previously.

The fins, support columns, and flow chambers are designed to achieve the maximum possible flow turbulence and to control the flow path of coolant/heat carrier. The sharp square corners of the fins and columns create flow turbulence and help to control the flow of coolant ensuring even flow and uniform heat transfer. Increasing the flow turbulence produces enhanced heat transfer, however, when this concept is coupled with a doubling of the contact area between fluid and plate and high heat transfer materials, superior heat transfer capabilities are attained. The fins and columns increase the surface area in contact with coolant/heat carrier by 30%–60% at the minimum compared to conventional cooling lines used in existing tooling depending of the geometry and density used. In addition, the gap where coolant or heating carrier flows totally surrounds the molded part thereby achieving faster heat removal rates and much more uniform cooling and heating as required. The cavity forming plate and flow passageway height and heat removal rates can be adjusted to each application by adjusting the material used to form the plate, the flow passageway height. The coolant/heating flow path can be adjusted to each application by adjusting the position, size and shape of the in-out flow chambers used to form the flow passageway and adjusting the temperatures and flow rates of the cooling flow carrier.

This new design concept provides for added stiffness to internal cores molding thin wall compartments as well as providing increased heat removal rates. In addition, the improved cooling system may be used in conventional tooling designs without the use of the preliminary heating method for molding described previously.

One of the main results derived from this invention is that much lower injection pressures and clamp tonnages will be necessary because of the resultant increase in heat removal rates in the mold. A heated carrier fluid or electric heater could heat up the cavity wall just before injection to near the material melt temperature. This will make it possible to fill the cavity under much more reduced pressures. Once the cavity has been filled completely, a flow of much colder fluid is introduced in the flow passageway achieving rapid and even cooling of the entire part. Due to the superior heat transfer rates achieved with this invention the entire process can be completed at much faster rates than in existing methods thereby making it more economically feasible.

This invention makes possible much shorter production cycles because of the increased efficiency of heat removal and because of the faster temperature control over the entire cavity surface.

According to a present further feature of the present invention separate temperature and flow controls of coolant and heating fluid can be incorporated for different parts of the cavity such as the sprue area.

In addition, a heat insulating material is utilized to isolate the cavity plate from the rest of the tool thereby ensuring minimum thermal losses.

After the plastic material has completed filling the cavity a valve will stop the flow of heated fluid carrier into the cavity plate gap and will switch to cold flow controller. The cold flow controller will supply coolant at very high rates through the flow passageway surrounding the cavity ensuring rapid and uniform cooling of the plastic in the cavity. Once the cooling process is completed the mold then opens and the entire process starts over again.

This invention can also be applied to other processing methods used in plastics such as blow molding, extrusion, extrusion-blow as well as thin wall injection molding such as package containers and electric battery cases and may have an important application in other heat transfer applications such as diecasting metals.

DESCRIPTION OF THE PREFERRED EMBODIMENTS

Figure 1:
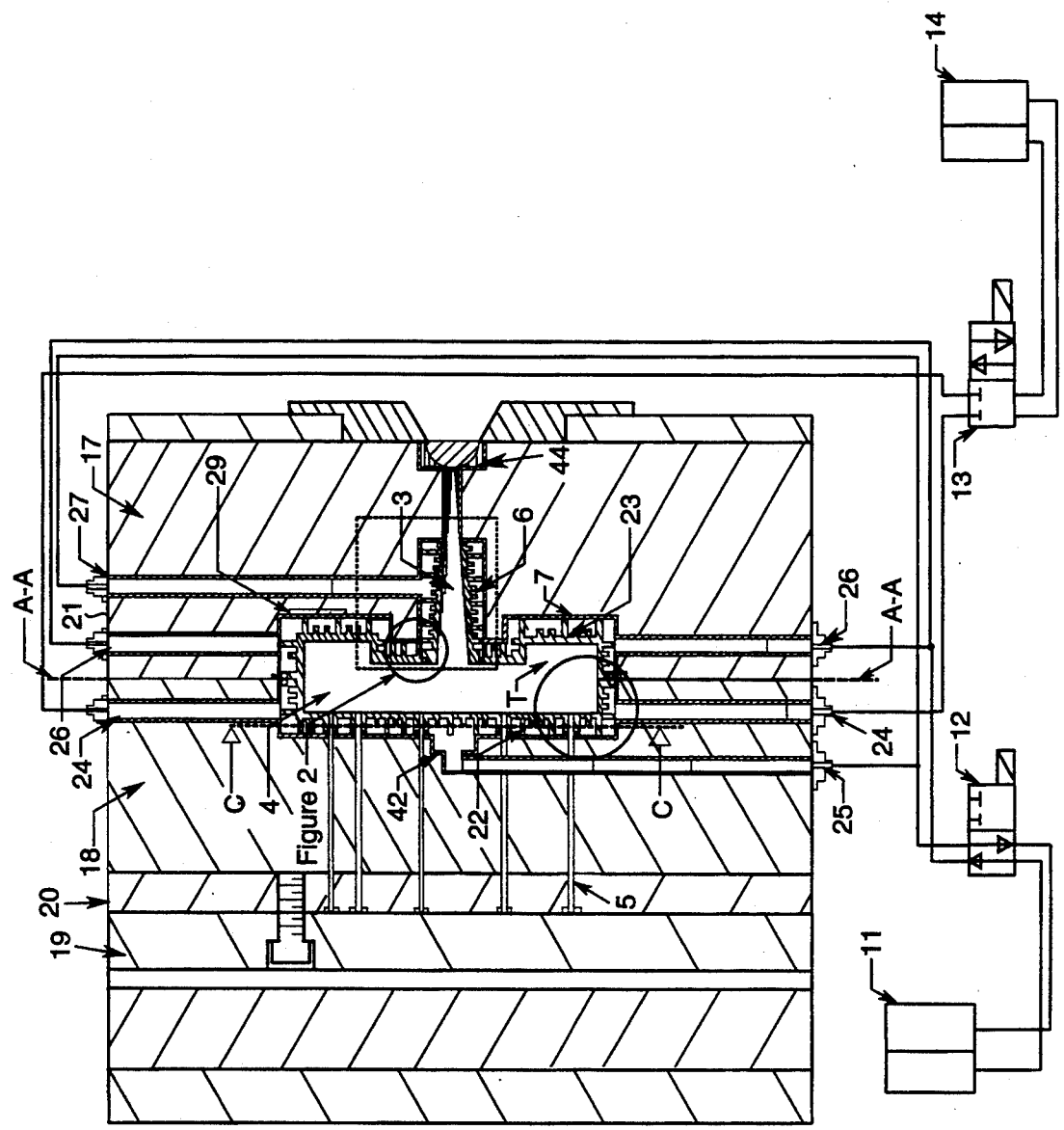
FIG. 1 is a schematic sectional view of an injection molding apparatus.

Referring to FIG. 1 of the drawings, there is shown a schematic sectional view of an enhanced thermal transfer mold apparatus which includes an injection molding machine 1, such machine 1 being shown to include a discharge end 2 by which plastic material treated in machine 1 is fed into an injection mold, generally designated 21.

The mold 21 is parted along a plane A—A and includes a mold half 17 and mold half 18. During injection, the mold halves 17 and are pressed against each other for closing the mold 21. Provided in mold 21 is a cavity 4 which, for ease of illustration, is increased in thickness in relation to the surrounding tooling. The cavity 4 is defined by a outer cavity insert plate 23 and an inner cavity insert plate 22 which are spaced from each other to provide a space therefore between which represents cavity 4.

Figure 2:
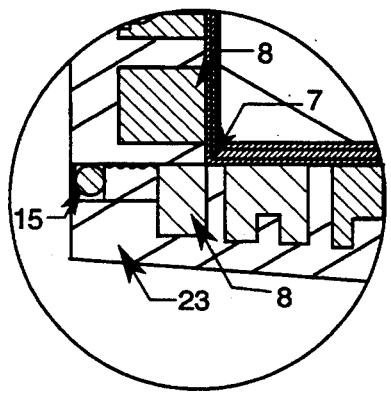
FIG. 2 is a cross sectional view of outer cavity insert plate and sprue bushing insert plate.
Figure 3:
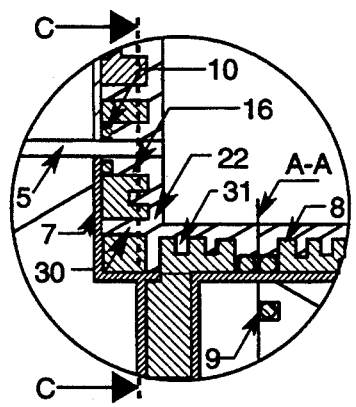
FIG. 3 is a cross sectional view of inner cavity insert plate.

As shown in FIG. 1, the inner cavity insert plate 22 extends in the mold half 18 and is fixedly attached to mold half 18. The outer cavity insert plate 23 extends in the mold half 17 and is fixedly attached to mold half 17. The plates 22 and 23 have a flow passageway 8 as seen in FIG. 2 and 3. The flow passageway 8 is defined therebetween plates 22 and 23 and halves 17 and 18 and insulating jacket 7. The passageway 8 thus extends between the inside wall surface of plates 22 and 23 opening away from the cavity 4 so as to encase the cavity 4.

Figure 4:
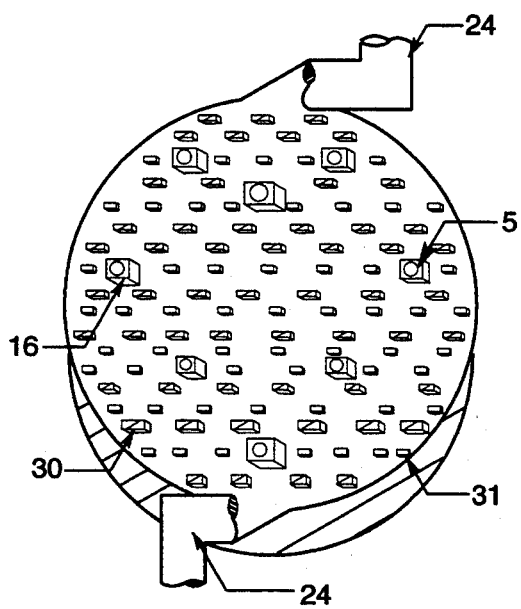
FIG. 4 is a plane view of plane C—C.

Additional detail of inner cavity insert plate 22 as seen in FIG. 3 shows the ejector pin 5 and the ejector support column 16 surrounded by ejector pin seal 10. FIG. 4 is a plane view along plane C—C. This view provides for a view of plate 22 middle cross section showing the overall allocation of cavity columns 30, ejector pins 5, fins 31, and ejector support columns 16 surrounding ejector pins 5. These features can be easily machined and the overall distribution can be changed as required for the application.

Plates 22 and 23 are thermally insulated from mold halves 17 and 18 by insulating jacket 7 which surrounds plates 22 and 23. Additional insulation can be provided with air gaps 29 as needed between the insulating jacket 7 surrounding the plates 22 and 23 and mold halves 17 and 18 as shown in air gap 29. The flow of heat/coolant fluid is introduced into the passageway 8 through inner mold in-flow line 24 in mold half 18, with the outgoing flow going out of the passageway 8 through inner mold out-flow line 25 and chamber 42. The flow of heat/coolant fluid is introduced into the passageway 8 through outer mold in-flow line 26 in mold half 17, with the outgoing flow going out the passageway 8 through outer mold out-flow line 27.

The flow of heat/coolant fluid can be independently controlled for halves 17 and 18, as well as the sprue bushing insert plate 6. As shown in FIG. 1, coolant control valve 12 and heating control valve 13 can switch from coolant control 11 to heating control 14. Sprue bushing insert plate 6 is threaded into outer cavity insert plate 23 on mold half 17 and sealed by sprue bushing seal 15 seen in FIG. 2 forming the sprue area. A plurality of flow can also be used to achieve the same result. The plastic is introduced into the cavity 4 through the sprue bushing 44 and sprue bushing insert plate 6.

Independent temperature and flow control of the sprue bushing 44 and insert plates 23 and 6 can be achieved by separate controllers for heating and cooling as needed with the necessary in and out flow lines added as required in specific applications. The sprue bushing insert plate 6 is surrounded by insulating jacket 7 and is in contact with the sprue bushing 44 for temperature control. In addition, the entire sprue bushing insert plate 6 could also be controlled by cavity insert plate 23 for increased temperature control if necessary.

In order to allow the molding to be extracted, the injection mold 21 is provided with an ejector generally designated with reference numeral 19. The ejector 19 includes an ejector plate 20 which supports a plurality of ejector pins 5 for ejecting the finished molding T from the mold 21. The ejection of the finished molding T is obtained by separating mold halves 18 and 17 from each other in the area of their parting line A—A as indicated by the respective double arrows. When moving the mold halves 17 and 18 apart, the molding T adheres to the inner plate 22 in mold half 18, and the ejector pins 5 which traverse respective paths in the mold 21, then push the molding T off the inner plate 22. After ejection of the molding T from mold 21, mold halves 17 and 18 are moved toward each other to close the mold 21 while ejector 19 is returned to its initial position.

DESCRIPTION OF FIGS. 6, 7, 8 AND 9

Figure 7:
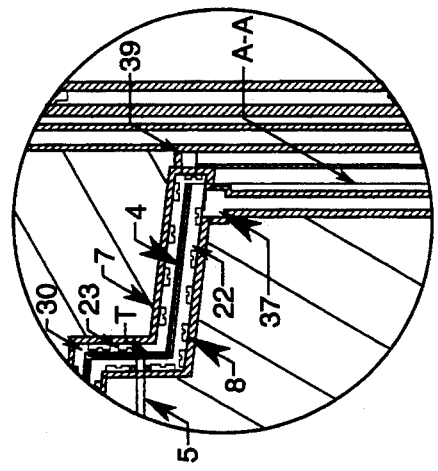
FIG. 7 shows a cross section of the two cavity plates.
Figure 6:
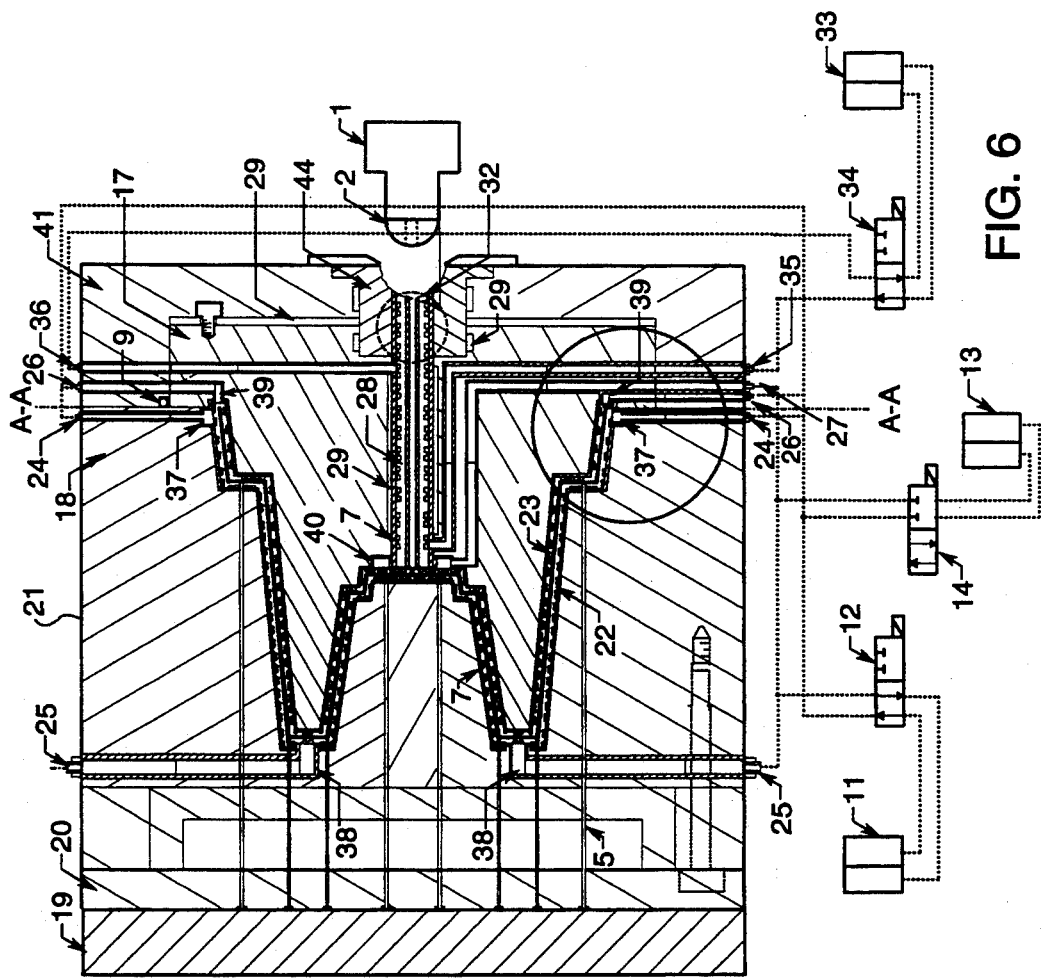
FIG. 6 is a schematic sectional view of an injection molding apparatus showing a planter mold.
Figure 9D:
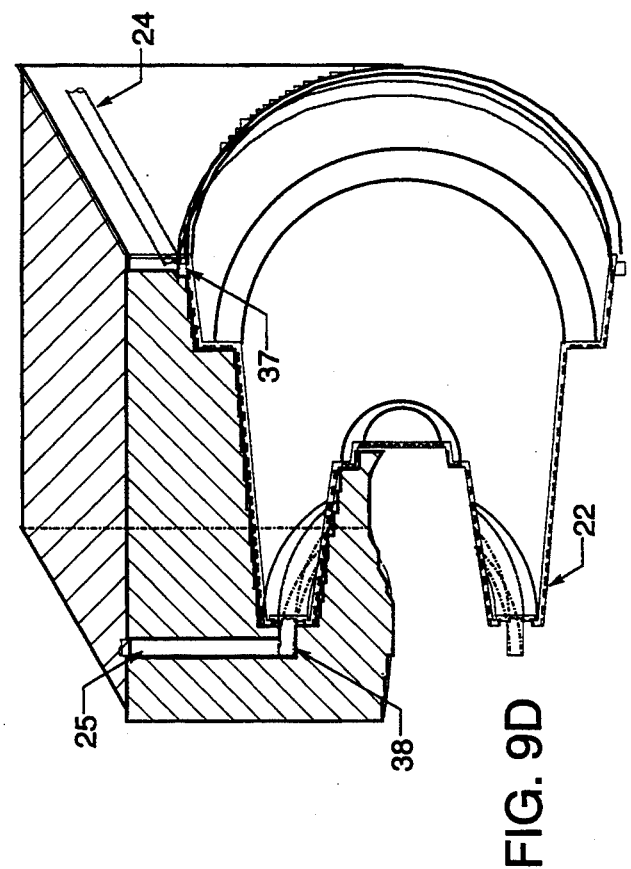
FIG. 9 shows the inner and outer cavity surface plates.
Figure 9C:
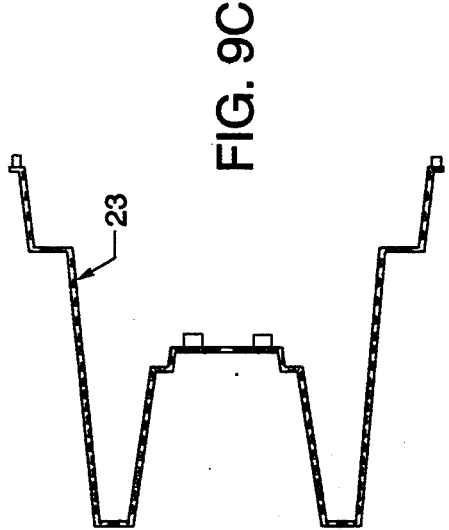
Figure 9A:
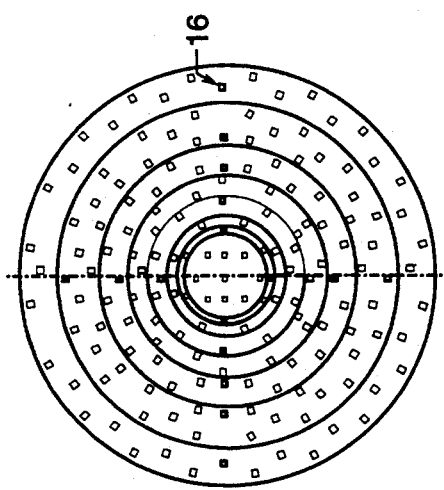
Figure 9B:
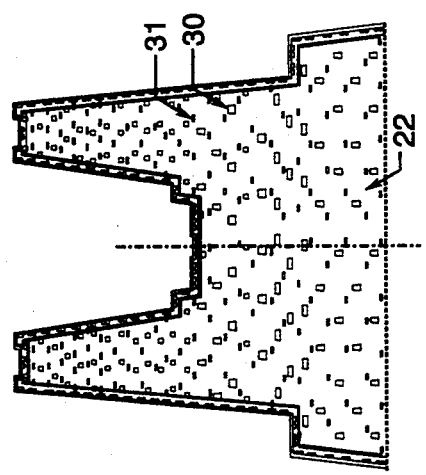

Referring now to FIG. 6, there is shown a schematic sectional view of an injection molding apparatus 21 containing, for illustrative purposes only, a mold for a planter. The same elements of the invention depicted in FIG. 1 are contained within FIG. 6, with the exception that, as shown in FIG. 6 and 7, the flow of heat/coolant fluid is introduced into the passageway 8 through line 24 and ,through in-flow chamber inner 37 on the inner half of the cavity insert plate 22 on mold half 18, the out-flow chamber inner 38 provides the outgoing flow out of passageway 8 through line 25. The circular nature of the chambers 37 and 38 provides for a uniform flow of heat/coolant into the flow passageway 8 insuring uniform coverage and heat transfer throughout the part. The flow of heat/coolant fluid is introduced into the outer mold in-flow line 26 through outer mold in-flow chamber 39 and the outflow goes out through line 27 and outer out-flow chamber 40 on the outer half of the cavity insert plate 23 and mold half 17. A plurality of flow can also be used to achieve the same result.

Figure 8:
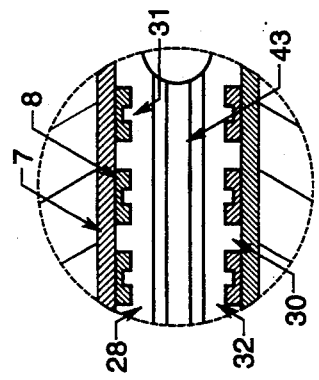
FIG. 8 shows a cross section of the injection manifold.

The flow of heat/coolant is independently controlled for the injection manifold 32 in FIG. 8 by a separate injection manifold heating control 33 because of the need to maintain the runner 43 heated all the time. In this case, runner 43 is heated by the injection manifold insert plate 28, which contains passageway 8 and the injection manifold plate 28 and fins 31 as seen in FIG. 8.

The flow of heat/coolant is controlled for both halves 17 and 18 of mold cavity 4 as well as the runner 43 by using three control systems and valves. Coolant control valve 12 controls the cooling of the inner 22 and outer 23 cavity plates using the coolant control 11 while heating control 13 controls the heating of the inner and outer cavity plates 22 and 23 with control valve 14. A plurality of heating and coolant valves can be used instead of a single heating and coolant control valve to achieve the same results. Injection manifold control valve 34 also controls the flow of heating fluid to the injection manifold plate 28 with the heating control 33.

DESCRIPTION OF FIG. 10

Figure 10A:
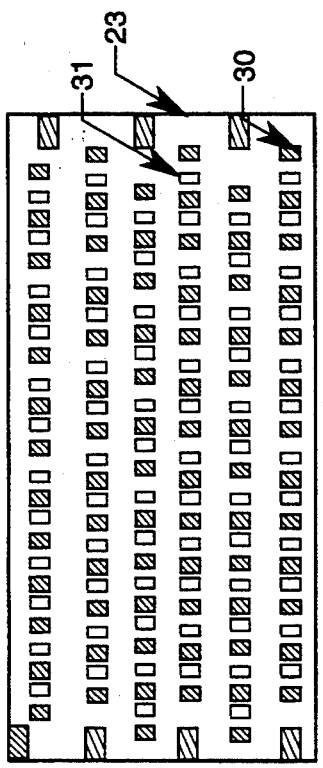
FIG. 10 shows a schematic sectional view of a beverage bottle crate mold.
Figure 10B:
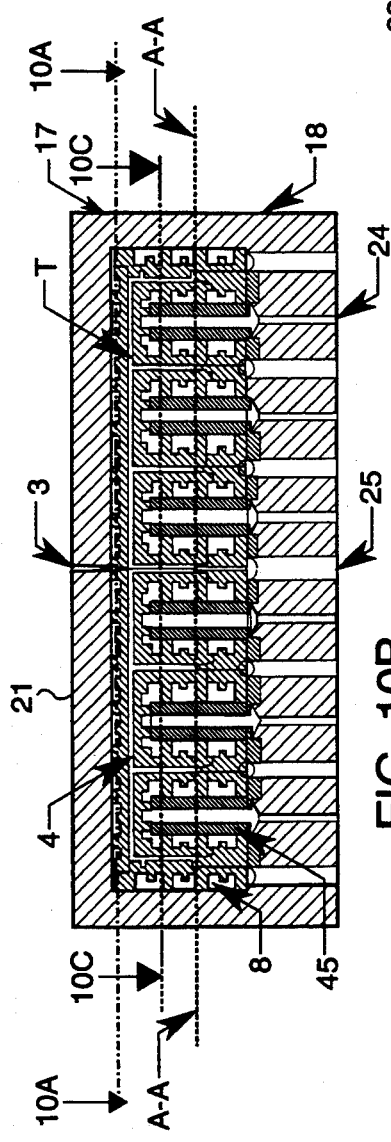
Figure 10C:
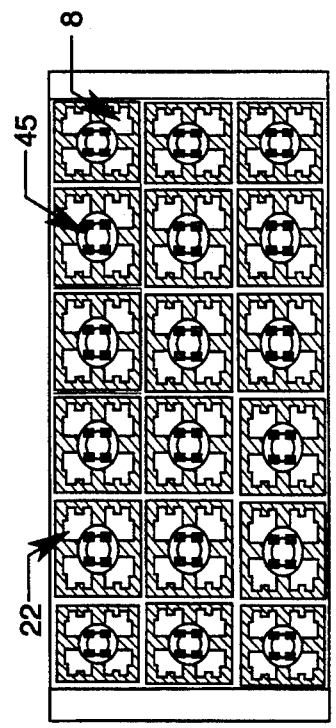

Referring to FIG. 10 there is shown a schematic sectional view of an injection molding apparatus 21, for illustrative purposes only, a mold for a beverage bottle crate. A core 45 supports and forms the inner cavity plate wall which forms the inner plastic walls of the crate.

After having described the elements of an injection molding apparatus in accordance with the invention, its mode of operation will now be set forth in more detail.

Plastic material, for example, such as polypropylene is a semi-crystalline polymer material and is injectable in various viscosity ranges. These plastic materials have a melting temperature range of 350–450 degrees F. Other plastic materials may be treated in the injection molding machine 3 as well, especially those with low viscosity at the melting temperature. Melt temperature for the entire range of thermoplastic material can range from 300–600 degrees F. There are two main types of plastic materials: crystalline and amorphous. The crystalline type tend to be opaque materials like polypropylene and Nylon. The amorphous materials tend to be clear line Acrylic, Polycarbonate(Lexan), etc. Crystalline polymers are affected greatly by temperature/cooling rate. The physical properties of these materials depend to a great deal on their crystalline nature, for example, the shrinkage rate of crystalline materials is much greater than amorphous materials.

Figure 5:
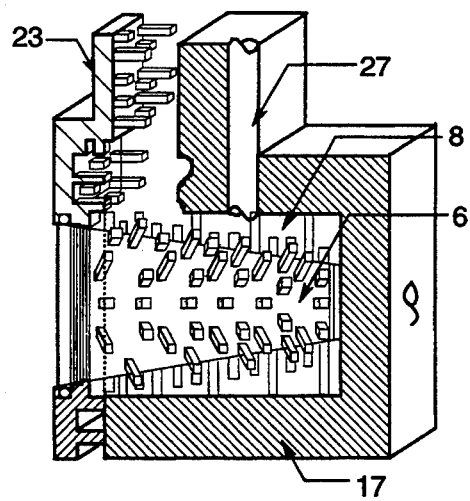
FIG. 5 is a cross sectional view of the sprue bushing insert plate.
Figure 5A:
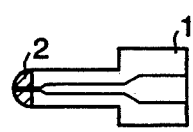

During the preparation of the plastic material in the machine 1, the temperature of the cavity surface plates 22, 23 and 28 in FIG. 1 and 5 may be raised to a level which is below or just slightly above the melt temperature of the material being molded. The new invention allows for a much more efficient way to raise/lower the temperature of the cavity plate because of it inherent thermal design characteristics. The resultant increased control of the temperature of cavity surface means that conventional materials as well as hard to flow materials will benefit greatly from this new concept. The tool cavity is warmed rapidly and uniformly before the material is forced into the cavity. The result is a dramatic reduction in the pressures required to fill the cavity and specially in hard to fill and large tools. Once the material completes filling the cavity a timer controlling the flow of coolant fluid connects the passageway 8 in the cavity insert plates to the flow cold fluid. The enhanced cooling capability of the cavity insert plate allows for much faster removal of the resident heat present in the cavity insert plate (because of the initial heating) and the latent heat stored in the molten plastic. The results of this process are much better quality parts, increased dimensional control, faster filling times, lower injection and clamp pressure and increased production rates.

I claim:

1. An enhanced thermal transfer injection molding apparatus for increasing uniformity and rate of heat transfer surrounding a molten part comprising:
   an injection mold having an inner half and an outer half, said halves each having a first wall and a second wall;
   an inner and outer cavity insert plate located in said inner and outer halves respectively, said cavity insert plates containing fins and columns integral to one side thereof, said columns being higher than said fins;
   a cavity formed between said inner and outer cavity insert plates when said first walls of said inner half and said outer half of said injection mold are pressed against each other; insulating means attached to said first walls of said halves to reduce heat transfer away from the cavity, said columns of said cavity insert plates being pressed against said first walls of said halves, thereby creating a passageway between said cavity insert plates and said insulating means so that fluid flows freely throughout said passageway when said first walls of said inner half and said outer half of said injection mold are pressed against each other;
   an injection molding machine having a discharge end by which said material being molded is treated in said injection molding machine and is injected into said cavity through said discharge end;
   means for heating a fluid to melt said material injected into said cavity;
   means for cooling a fluid to solidify said material injected into said cavity;
   means for injecting and discharging said heated fluid into said passageway to heat said cavity insert plates; and
   means for injecting and discharging said cooled fluid into said passageway to cool said cavity insert plates.

2. The apparatus as defined in claim 1, further comprising; a sprue having a sprue bushing insert plate, said sprue bushing insert plate containing inter-spaced fins and columns integral to one side thereof, said columns pressed against said insulating means of said first wall of said outer half, said sprue bushing insert plate forming a seal with said outer cavity insert plate whereby said passageway extends around said sprue and said cavity is formed between the inside walls of said sprue bushing insert plate whereby said material treated in said machine is injected into said cavity.

3. The apparatus as defined in claim 1, further comprising: an injection manifold having an injection manifold insert plate, said injection manifold insert plate containing inter-spaced fins and columns integral to the outside of said injection manifold insert plate rests against said insulating means and said outside of said injection manifold insert plate, said injection manifold insert plate and said means for injecting and discharging said heated and cooled fluid into said passageway to heat and cool said injection manifold insert plate, said runner forming a seal with said outer cavity insert plate whereby said material treated in said machine is injected into said cavity.

4. The apparatus as defined in claim 1, wherein the means for injecting said heated and cooled fluid comprises: a heating control valve and a coolant control valve which controls the flow of the respective fluid into an inner mold in-flow line and an outer mold in-flow line, said lines open to and integral with said passageway and from which said fluid is discharged into a inner mold out-flow line and a outer mold out-flow line, from which said fluid is circulated back to said control valves and said heating and cooling means.

5. The apparatus as defined in claim 2, wherein the means for injecting said heated and cooled fluid comprises: a heating control valve and a coolant control valve which controls the flow of the respective fluid into a plurality of inner mold in-flow lines and a plurality of outer mold in-flow lines, said lines open to and integral with said passageway and from which said fluid is discharged into a plurality of inner mold out-flow lines and a plurality of outer mold out-flow lines, from which said fluid is circulated back to said control valves and said heating and cooling means.

6. The apparatus as defined in claim 3, wherein the means for injecting said heated and cooled fluid comprises: a plurality of heating control valves and a plurality of coolant control valves, a first set of said heating and cooling control valves controlling the flow of the respective fluid into a plurality of inner mold in-flow lines and a plurality of outer mold in-flow lines, said lines open to and integral with said passageway and from which said fluid is discharged into a plurality of inner mold out-flow lines and a plurality of outer mold out-flow lines, from which said fluid is circulated back to said first set of control valves and a first set of said heating and cooling means, and a second set of said heating control valves controlling the flow of the respective fluid into said passageway of said injection manifold from which said fluid is circulated back to said second set of control valves and a second set of said heatings means.

7. The apparatus as defined in claim 3, wherein the means for injecting said heated and cooled fluid comprises: a plurality of heating control valves and a plurality of coolant control valves, said heating and cooling control valves controlling the flow of the respective fluid into a plurality of inner mold in-flow lines and a plurality of outer mold in-flow lines, said lines open to and integral with said passageway and from which said fluid is discharged into a plurality of inner mold out-flow lines and a plurality of outer mold out-flow lines, from which said fluid is circulated back to said first set of control valves, said heating control valves controlling the flow of the respective fluid into said passageway of said injection manifold from which said fluid is circulated back to said heating control valves and said heating means.

8. The apparatus as defined in claim 1, further comprising:
an ejector having an ejector plate, said ejector plate having a plurality of ejector pins extending through said inner mold half and said columns of said inner cavity insert plate whereby said ejector pins separate a finished molding from said inner cavity insert plate.

9. The apparatus as defined in claim 2, further comprising:
an ejector having an ejector plate, said ejector plate having a plurality of ejector pins extending through said inner mold half and said columns of said inner cavity insert plate whereby said ejector pins separate a finished molding from said inner cavity insert plate.

10. The apparatus as defined in claim 3, further comprising:
an ejector having an ejector plate, said ejector plate having a plurality of ejector pins extending through said inner mold half and said columns of said inner cavity insert plate whereby said ejector pins separate a finished molding from said inner cavity insert plate.

11. The apparatus as defined in claim 2, further comprising:
a first in-flow chamber placed between at least one of said inner mold in-flow lines and said passageway and a first out-flow chamber placed between at least one of said inner mold out-flow lines and said passageway, and a second in-flow chamber placed between at least one of said outer mold in-flow lines and said passageway and a second out-flow chamber placed between at least one of said outer mold out-flow lines and said passageway, said chambers to provide for a uniform flow of heated and cooled fluid into the passageway insuring uniform coverage and heat transfer throughout the apparatus.

12. The apparatus as defined in claim 3, further comprising:
a first in-flow chamber placed between at least one of said inner mold in-flow lines and said passageway and a first out-flow chamber placed between at least one of said inner mold out-flow lines and said passageway, and a second in-flow chamber placed between at least one of said outer mold in-flow lines and said passageway and a second out-flow chamber placed between at least one of said outer mold out-flow lines and said passageway, said chambers to provide for a uniform flow of heated and cooled fluid into the passageway insuring uniform coverage and heat transfer throughout the apparatus.

13. The apparatus as defined in claim 1, wherein said fins and columns have sharp square corners to create flow turbulence and to control flow and uniform heat transfer.

* * * * *